United States Patent [19]

Norvell et al.

[11] 4,432,660
[45] * Feb. 21, 1984

[54] GLASS- OR CERAMIC-TO-METAL SEALS

[75] Inventors: Gordon S. Norvell, Thousand Oaks; Donald W. King, Pomona, both of Calif.

[73] Assignee: Litton Systems, Inc., Beverly Hills, Calif.

[*] Notice: The portion of the term of this patent subsequent to Jun. 16, 1998 has been disclaimed.

[21] Appl. No.: 255,591

[22] Filed: Apr. 20, 1981

Related U.S. Application Data

[62] Division of Ser. No. 105,759, Dec. 20, 1979, Pat. No. 4,273,282.

[51] Int. Cl.³ .................. F16C 9/00; F16D 1/00; F16G 11/00
[52] U.S. Cl. ............................... 403/29; 403/179
[58] Field of Search ................ 403/179, 28, 29, 30, 403/288

[56] References Cited

U.S. PATENT DOCUMENTS

| | | | |
|---|---|---|---|
| 2,015,484 | 9/1935 | Lilienfeld | 403/179 |
| 2,651,144 | 9/1953 | Foley et al. | 403/28 X |
| 2,709,147 | 5/1955 | Ziegler | 228/173 R X |
| 3,179,213 | 4/1965 | Kuehne et al. | 403/30 X |
| 3,304,362 | 2/1967 | August | 403/28 X |
| 3,389,215 | 6/1968 | Rice et al. | 403/30 X |
| 3,798,746 | 3/1974 | Alphonse et al. | 228/116 |
| 4,159,075 | 6/1979 | Ljung et al. | 228/116 |
| 4,273,282 | 6/1981 | Norvell | 228/116 |

*Primary Examiner*—Wayne L. Shedd
*Attorney, Agent, or Firm*—Roy L. Brown

[57] ABSTRACT

A seal between a metal surface and a surface of glass or glass-like ceramic having, in juxtaposition, the metal, gold, an indium-gold alloy, indium, and either glass or a glass-like ceramic.

32 Claims, 4 Drawing Figures

GLASS- OR CERAMIC-TO-METAL SEALS

This is a division of application Ser. No. 105,759, filed Dec. 20, 1979, now U.S. Pat. No. 4,273,282.

BACKGROUND OF THE INVENTION

When fabricating ring lasers, it is desirable to attach a metal cathode and one or more metal anodes to a glass or to a glass-like ceramic material such as those known by the trademarks of "ZERODUR" or "CERVIT".

Typically the cathode or anode is aluminum or copper, although the method of this invention could be used to attach other metals such as, for example, iron, steel, nickel, tantalum, or niobium to glass or glass-ceramic material.

The details herein pertain specifically to aluminum and copper.

The closest prior art known to the applicants is that described in United Kingdom Pat. No. 687,259 to The British Thomson-Houston Company Limited, which describes a glass-to-metal seal using a silver plating over the base metal and an indium plating over the silver, then casting molten glass into contact with an indium plated portion of the metal member.

Another prior art patent of interest is U.S. Pat. No. 3,777,281 which pertains to the use of gold and indium in forming a ceramic-to-ceramic seal.

Prior to this invention, gold in a liquid was painted onto both the glass and metal parts, and the parts were fired to leave just the gold. Next an indium wire was positioned between the two gold surfaces, and the indium was melted to solder the two gold surfaces together. The procedure was found to be unreliable, and many gas leaks were detected.

BRIEF DESCRIPTION OF THE INVENTION

This invention pertains to a glass-or glass-like ceramic-to-metal seal and the method of making such a seal. The seal of this invention is maintained in the presence of repeated temperature cycling between $-50°$ C. and $+100°$ C.

The glass or glass-like ceramic surface to be joined is first cleaned, and it is preferably super-cleaned. To super-clean the glass or glass-like ceramic surface, it is bombarded with an electrical plasma, or with electrical ions in a vacuum or with ultra-violet light.

When the base metal is aluminum, the surface of the aluminum at the seal is first ground to conform generally to the glass or glass-like ceramic surface. Nitric acid is next applied to etch the aluminum, and the excess nitric acid is washed off in water, preferably distilled water. The metal is then annealed, and the metal surface is coined by pressing it against a smooth, polished surface. For coining, the glass or glass-like ceramic surface is preferred because the aluminum does not stick to the glass or glass-like ceramic and the flatness of the glass or glass-like ceramic is maintained after repeated coining operations.

Gold is next applied to the aluminum surface. The gold could be applied by electroplating, but it has been found preferable to spray or brush the gold in a liquid onto the coined aluminum surface. The gold is then fired, and a second coat is applied and fired. The purity of the gold produced is on the order of 99.5% gold. A typical thickness of the gold, whether attached by spraying, brushing or electroplating is less than 100 micro inches.

A preform of indium is then placed over the gold surface. The indium is typically 99.9% pure indium. The indium and gold are then heated, preferably in vacuum, above the melting temperature of the indium ($155°$ C.) to around $175°$ C. until the indium has alloyed with the gold at their interface.

The indium surface is then super-cleaned with, for example, a plasma bombardment or an ion bombardment in a vacuum or with ultra-violet radiation. After the indium has been super-cleaned, it is very tacky, and it tends to adhere to whatever surface it contacts. The super-clean indium surface is then pressed onto the super-clean glass or glass-like ceramic surface to form a vacuum tight seal.

When the metal is copper, the copper is not etched with nitric acid, and the gold is preferably electroplated onto the copper. The surface of the copper is not coined but lapped using small (typically 1200 micron) particles before the gold is plated on the copper.

It is therefore an object of this invention to provide a method for sealing a metal to glass or to a glass-like ceramic.

It is another object of this invention to provide a glass or glass-like ceramic-to-metal seal.

It is a specific object of this invention to use an indium gold alloy attached to a metal and having an indium surface to achieve the seal of this invention.

It is also a specific object of this invention to achieve the above results wherein the metal is aluminum or copper.

Other objects of this invention will become apparent from the following description, taken together with the accompanying drawings.

DETAILED DESCRIPTION OF THE INVENTION

Ring lasers typically are fabricated from a block of glass or glass-like ceramics. Metal anodes and cathodes are attached to the glass or glass-like ceramic block. Typically the cathodes and anodes are fabricated of aluminum or copper, and they must adhere to the glass or glass-like ceramic block in an air-tight seal because the gas within the laser and the cathode or anode structure is maintained at a low pressure below atmospheric pressure, and the gasses must remain pure and clean.

Figure 1:
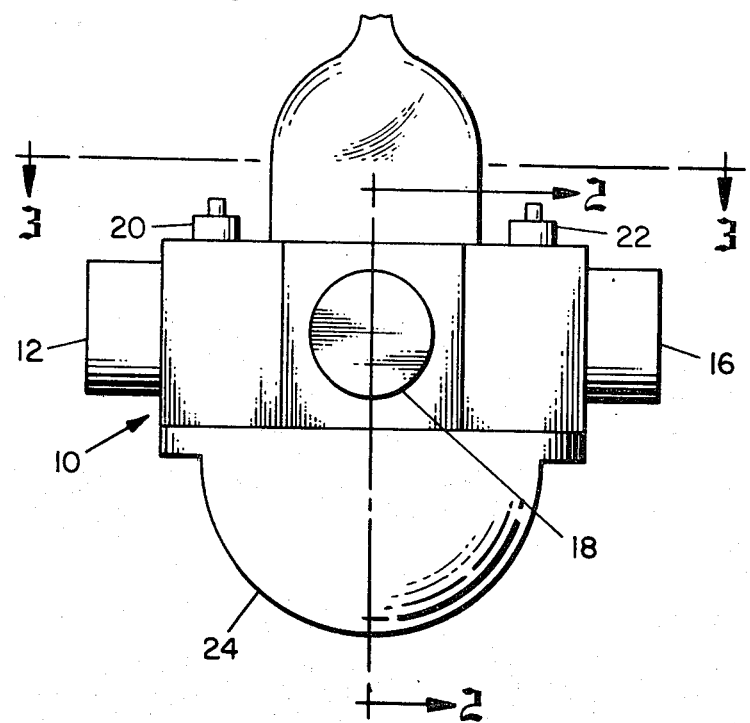
FIG. 1 shows a typical ring laser.
Figure 2:
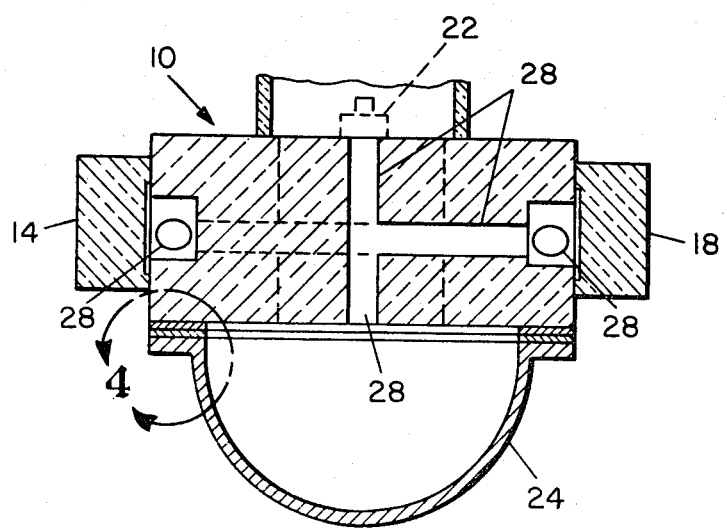
FIG. 2 shows a view of FIG. 1, partly in section, taken at 2—2 in FIG. 1.
Figure 3:
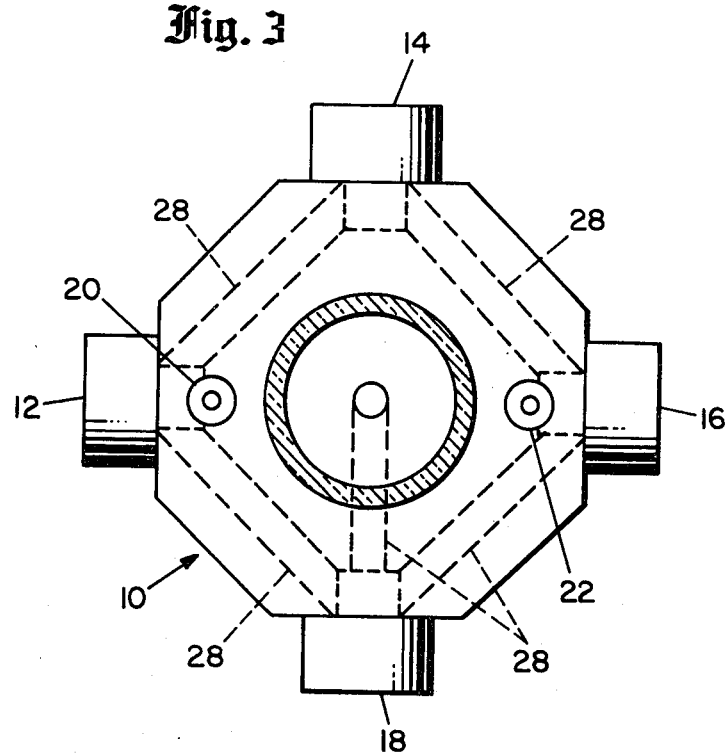
FIG. 3 is a view, partly in section, taken at 3—3 in FIG. 1.
Figure 4:
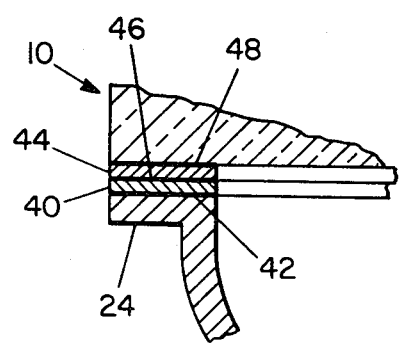
FIG. 4 is a sectional view taken at 4—4 in FIG. 2.

A ring laser is shown in FIGS. 1, 2 and 3. A block of glass or glass like ceramic 10 may be shaped, for example, in the shape of an octagon with separate glass or glass-like ceramic blocks 12, 14, 16, 18 on four faces thereof for supporting mirrors which define the ring laser path. A pair of anodes 20, 22 are typically of copper base metal. A cathode 24 is typically of aluminum base metal. A plurality of conduits 28, typically containing a gas such as neon at a vacuum pressure, interconnect the interior of the anodes 20, 22, the cathode 24 and the mirrors on the faces of the blocks 12, 14, 16, 18.

The cathode 24 and the anodes 20, 22 must be attached to the glass or glass-like ceramic block 10 in a vacuumtight seal, and the seal and the method of attaching are the subject of this invention.

For the best seal between the metal 24 and the glass or glass-like ceramic 10, the glass or glass-like ceramic should be super-clean. By super-clean it is meant that the final stage of cleaning of the glass or glass-ceramic surface is by plasma bombardment or ion bombardment in a substantial vacuum, or ultra-violet light. Typically, the glass or glass-like ceramic surface is first washed in a cleaning solution which contains chromic and sulfuric acid. It is then washed in hydrochloric acid and rinsed in distilled water. The surface of the glass or glass-like ceramic ceramic is then air-baked to burn off organic materials and to evaporate remaining fluids. The surface of the glass or glass-like ceramic is next super-cleaned by placing it in a bell jar with gas at a low pressure wherein an electrical plasma or ion stream is directed onto the surface. Alternatively an ultra-violet light may be directed onto the surface of the glass or glass-like ceramic.

To fasten the aluminum cathode 24 onto the glass or glass-like ceramic 10, a gold layer 40 comprising gold in a liquid is sprayed or brushed, preferably in two consecutive coats, onto the surface 42 of the aluminum 24. Each coat of the gold liquid is fired to remove the liquid and leave gold having a total thickness which is preferably less than 100 microinches.

A preform 44 of indium is laid over the gold, and the structure is heated above the melting point of indium (155° C.) to about 175° C. The indium is typically on the order of 99.9% pure indium, and it has a typical thickness on the order of 0.007 inches. The indium 44 alloys with the gold 40 at the interface 45 between the gold and indium.

After cooling, typically to room temperature, the structure with an indium face has its indium surface 48 super-cleaned by putting it in a bell jar at low pressure and irradiating the surface with electrical plasma, ions or ultra-violet light. The surface of the indium gets very tacky or sticky so it will adhere easily to another surface.

The sticky surface of indium is then pressed onto the super-clean surface of the glass or glass-like ceramic to produce a vacuum-tight seal.

Instead of putting the gold in liquid onto the surface 42, the gold may be electroplated or otherwise attached or plated onto that surface. Indeed when the base metal is copper, it is preferable to electroplate the gold onto the base metal. The base metal of the anodes 20, 22 is preferably copper, and the anodes 20, 22 are typically plated all over with gold. For purposes of this process, however, only the adhering surface need be electroplated with gold to a thickness of substantially less than 100 microinches. Typically the plated gold is more than 99.9% pure gold.

After the gold 40 is plated onto the base metal, the layer of indium 44 is laid over the gold 40, and the structure is heated above the melting point of indium to produce a gold indium alloy at the interface 46. After cooling, the indium 44 is super-cleaned by plasma bombardment or ion bombardment in a vacuum or by ultra-violet irradiation. The sticky super-clean surface of the indium is then pressed onto the super-clean surface of the glass or glass-like ceramic to form a vacuum-tight seal.

In a preferred embodiment of the invention, the surface 42 of the base metal 24 is first prepared to receive the layer of gold 40. The surface is first ground and polished to take out scratches, dents, waves, and in general to conform the surface 32 to the surface of the glass-or glass-ceramic 10. When the base metal 24 is aluminum, the surface may optionally be treated with a solution of about 50% nitric acid to remove inpurities from the aluminum. The nitric acid residue is then washed off in distilled water, and the surface is heat-dried. The base metal is preferably annealed before the gold 40 is applied. Optionally the base metal 24 may be coined after annealing and before the gold 40 is applied. The coining may be achieved by pressing the surface against a flat surface such as the surface of a flat piece of glass. Coining of the surface is preferable when the base metal 24 is aluminum.

Instead of coining the base metal 24 after annealing, it may be lapped. A typical lapping compound uses 1200 micron particles.

The process may be used to attach other metals to a glass or glass-like ceramic surface. Any surface which will accept the gold overlay either by receiving it in a gold liquid form and firing or by electroplating may be attached to the glass or glass-ceramic by placing the indium over the gold and forming a gold-indium alloy interface, then super-cleaning the glass or glass-like ceramic and the indium surfaces before the indium is pressed onto the glass or glass-like ceramic surface. The base metal 24 must be a metal having a melting point higher than indium so that the indium may be alloyed with the gold without affecting the base metal. Typical other metals which may be used as a base metal 24 are iron, steel, nickel, tantalum or niobium.

Two typical glass-like ceramics with which the process works effectively are known by the trademarks of "ZERODUR" and "CERVIT."

Although the invention has been described in detail above, it is not intended that the invention shall be limited by that description, but only in accordance with such description taken together with the accompanying claims.

What is claimed is:

1. A seal between a metal surface and a glass surface comprising in juxtaposition, said metal, gold, an indium-gold alloy, indium, and said glass.

2. A seal between a metal surface and a second surface of glass made by the process comprising:
   attaching a layer of gold to said metal surface;
   placing a layer of indium over said layer of gold;
   heating said gold and indium above the melting point of indium to form a gold-indium alloy at the interface between said gold and indium;
   cooling; and
   pressing said indium onto said second surface.

3. A seal between a metal surface and a second surface of glass made by the process comprising:
   electroplating a layer of gold onto said metal surface;
   placing a layer of indium over said layer of gold;
   heating said gold and indium above the melting point of indium to form a gold-indium alloy at the interface between said gold and indium;
   cooling; and
   pressing said indium onto said second surface.

4. A seal between a metal surface and a second surface of glass made by the process comprising:
   applying a layer of gold, in the form of gold in a liquid, onto said surface of said metal;
   firing said gold to leave a gold layer on said metal surface;
   placing a layer of indium over said layer of gold;

heating said gold and indium above the melting point of indium to form a gold-indium alloy at the interface between said gold and indium;
cooling; and
pressing said indium onto said second surface.

5. A seal between a metal surface and a second surface of glass made by the process comprising:
applying a layer of gold, in the form of gold in a liquid, onto said surface of said metal;
firing said gold to leave a gold layer on said metal surface;
placing a layer of indium over said layer of gold;
heating said gold and indium above the melting point of indium to form a gold-indium alloy at the interface between said gold and indium;
cooling;
cleaning said surfaces by plasma; and
pressing said indium onto said second surface.

6. A seal between a metal surface and a second surface of glass made by the process comprising:
conforming the surface of said metal to said second surface;
attaching a layer of gold to said metal surface;
placing a layer of indium over said layer of gold;
heating said gold and indium above the melting point of indium to form a gold-indium alloy at the interface between said gold and indium;
cooling; and
pressing said indium onto said second surface.

7. A seal between a metal surface and a second surface of glass made by the process comprising:
conforming the surface of said metal to said second surface;
further smoothing the surface of said metal;
attaching a layer of gold to said metal surface;
placing a layer of indium over said layer of gold;
heating said gold and indium above the melting point of indium to form a gold-indium alloy at the interface between said gold and indium;
cooling; and
pressing said indium onto said second surface.

8. A seal between a metal surface and a second surface of glass made by the process comprising:
conforming the surface of said metal to said second surface;
mechanically removing scratches and dents in the surface of said metals;
attaching a layer of gold to aid metal surface;
placing a layer of indium over said layer of gold;
heating said gold and indium above the melting point of indium to form a gold-indium alloy at the interface between said gold and indium;
cooling; and
pressing said indium onto said second surface.

9. A seal between an aluminum surface and a second surface of glass made by the process comprising:
conforming the surface of said aluminum to said second surface;
mechanically removing scratches and dents in the surface of said rinsing said aluminum surface with water;
attaching a layer of gold to said aluminum surface;
placing a layer of indium over said layer of gold;
heating said gold and indium above the melting point of indium to form a gold-indium alloy at the interface between said gold and indium;
cooling; and
pressing said indium onto said second surface.

10. A seal between an aluminum surface and a second surface of glass made by the process comprising:
conforming the surface of said aluminum to said second surface;
mechanically removing scratches and dents in the surface of said aluminum;
etching said aluminum surface with a solution of nitric acid;
rinsing said aluminum surface with water;
coining said aluminum surface;
attaching a layer of gold to said aluminum surface;
placing a layer of indium over said layer of gold;
heating said gold and indium above the melting point of indium to form a gold-indium alloy at the interface between said gold and said indium;
cooling; and
pressing said indium onto said second surface.

11. A seal between a metal surface and a second surface of glass made by the process comprising:
conforming the surface of said metal to said second surface;
mechanically removing scratches and dents in the surface of said metal;
lapping said metal surface;
attaching a layer of gold to said metal surface;
placing a layer of indium over said layer of gold;
heating said gold and indium above the melting point of indium to form a gold-indium alloy at the interface between said gold and indium;
cooling; and
pressing said indium onto said second surface.

12. A seal between an aluminum surface and a second surface of glass made by the process comprising:
conforming the surface of said aluminum to said second surface;
mechanically removing scratches and dents in the surface of said aluminum;
etching said aluminum surface with a solution of nitric acid;
rinsing said aluminum surface with water;
applying a layer of gold, in the form of gold in a liquid, to the surface of said aluminum;
firing said gold to leave a gold layer on said aluminum surface;
placing a layer of indium over said layer of gold;
heating said gold and indium above the melting point of indium to form a gold-indium alloy at the interface between said gold and indium;
cooling; and
pressing said indium onto said second surface.

13. A seal between an aluminum surface and a second surface of glass made by the process comprising:
conforming the surface of said aluminum to said second surface;
mechanically removing scratches and dents in the surface of said aluminum;
etching said aluminum surface with a solution of nitric acid;
rinsing said aluminum surface with water;
coining said aluminum surface;
applying a layer of gold, in the form of gold in a liquid, to the surface of said aluminum;
firing said gold to leave a gold layer on said aluminum surface;
placing a layer of indium over said layer of gold;
heating said gold and indium above the melting point of indium to form a gold-indium alloy at the interface between said gold and indium;

cooling; and
pressing said indium onto said second surface.

14. A seal between an aluminum surface and a second surface of glass made by the process comprising:
conforming the surface of said aluminum to said second surface;
mechanically removing scratches and dents in the surface of said aluminum;
etching said aluminum surface with a solution of nitric acid;
rinsing said aluminum surface with water;
applying a first layer of gold, in the form of gold in a liquid, to the surfaces of said aluminum;
firing said gold to leave a first layer of gold on said aluminum surface;
applying a second layer of gold, in the form of gold in a liquid, to said first gold layer;
firing said gold to leave a second gold layer on said first gold layer;
placing a layer of indium over said second layer of gold;
heating said gold and indium above the melting point of indium to form a gold-indium alloy at the interface between said gold and indium;
cooling; and
pressing said indium onto said second surface.

15. A seal between an aluminum surface and a second surface of glass made by the process comprising:
conforming the surface of said aluminum to said second surface;
mechanically removing scratches and dents in the surface of said aluminum;
etching said aluminum surface with a sulution of nitric acid;
rinsing said aluminum surface with water;
coining said aluminum surface;
applying a first layer of gold, in the form of gold in a liquid, to the surface of said aluminum;
firing said gold to leave a first layer of gold on said aluminum surface;
applying a second layer of gold, in the form of gold in a liquid, to said first gold layer;
firing said gold to leave a second gold layer on said first gold layer;
placing a layer of indium over said second layer of gold;
heating said gold and indium above the melting point of indium to form a gold-indium alloy at the interface between said gold and indium;
cooling; and
pressing said indium onto said second surface.

16. A seal between a copper surface and a second surface of glass made by the process comprising:
electroplating a layer of gold onto the surface of said copper;
placing a layer of indium over said layer of gold;
heating said gold and indium above the melting point of indium to form a gold-indium alloy at the interface between said gold and indium;
cooling; and
pressing said indium onto said second surface.

17. A seal between a metal surface and glass-like ceramic surfaces comprising, in juxtaposition, said metal, gold, an indium-gold alloy, indium, and said glass-like ceramic surfaces.

18. A seal between a metal surface and a second surface of a glass-like ceramic made by the process comprising:
attaching a layer of gold to said metal surface;
placing a layer of indium over said layer of gold;
heating said gold and indium above the melting point of indium to form a gold-indium alloy at the interface between said gold and indium;
cooling; and
pressing said indium onto said second surface.

19. A seal between a metal surface and a second surface of glass-like ceramic made by the process comprising:
electroplating a layer of gold onto said metal surface;
placing a layer of indium over said layer of gold;
heating said gold and indium above the melting point of indium to form a gold-indium alloy at the interface between said gold and indium;
cooling; and
pressing said indium onto said second surface.

20. A seal between a metal surface and a second surface of glass-like ceramic made by the process comprising:
applying a layer of gold, in the form of gold in a liquid, onto said surface of said metal;
firing said gold to leave a gold layer on said metal surface;
placing a layer of indium over said layer of gold;
heating said gold and indium above the melting point of indium to form a gold-indium alloy at the interface between said gold and indium;
cooling; and
pressing said indium onto said second surface.

21. A seal between a metal surface and a second surface of glass-like ceramic made by the process comprising: applying a layer of gold, in the form of gold in a liquid, onto said surface of said metal;
firing said gold to leave a gold layer on said metal surface;
placing a layer of indium over said layer of gold;
heating said gold and indium above the melting point of indium to form a gold-indium alloy at the interface between said gold and indium;
cooling;
cleaning said surfaces by plasma; and
pressing said indium onto said second surface.

22. A seal between a metal surface and a second surface of glass-like ceramic made by the process comprising:
conforming the surface of said metal to said second surface;
attaching a layer of gold to said metal surface;
placing a layer of indium over said layer of gold;
heating said gold and indium above the melting point of indium to form a gold-indium alloy at the interface between said gold and indium;
cooling; and
pressing said indium onto said second surface.

23. A seal between a metal surface and a second surface of glass-like ceramic made by the process comprising:
conforming the surface of said metal to said second surface;
further smoothing the surface of said metal;
attaching a layer of gold to said metal surface;
placing a layer of indium over said layer of gold;
heating said gold and indium above the melting point of indium to form a gold-indium alloy at the interface between said gold and indium;
cooling; and
pressing said indium onto said second surface.

24. A seal between a metal surface and a second surface of glass-like ceramic made by the process comprising:
- conforming the surface of said metal to said second surface;
- mechanically removing scratches and dents in the surface of said metal;
- attaching a layer of gold to said metal surface;
- placing a layer of indium over said layer of gold;
- heating said gold and indium above the melting point of indium to form a gold-indium alloy at the interface between said gold and indium;
- cooling; and
- pressing said indium onto said second surface.

25. A seal between an aluminum surface and a second surface of glass-like ceramic made by the process comprising:
- conforming the surface of said aluminum to said second surface;
- mechanically removing scratches and dents in the surface of said aluminum;
- etching said aluminum surface with a solution of nitric acid;
- rinsing said aluminum surface with water;
- attaching a layer of gold to said aluminum surface;
- placing a layer of indium over said layer of gold;
- heating said gold and indium above the melting point of indium to form a gold-indium alloy at the interface between said gold and indium;
- cooling; and
- pressing said indium onto said second surface.

26. A seal between an aluminum surface and a second surface of glass-like ceramic made by the process comprising:
- conforming the surface of said aluminum to said second surface;
- mechanically removing scratches and dents in the surface of said aluminum;
- etching said aluminum surface with a solution of nitric acid;
- rinsing said aluminum surface with water;
- coining said aluminum surface;
- attaching a layer of gold to said aluminum surface;
- placing a layer of indium over said layer of gold;
- heating said gold and indium above the melting point of indium to form a gold-indium alloy at the interface between said gold and said indium;
- cooling; and
- pressing said indium onto said second surface.

27. A seal between a metal surface and a second surfce of glass-like ceramic made by the process comprising:
- conforming the surface of said metal to said second surface;
- mechanically removing scratches and dents in the surface of said metal;
- lapping said metal surface;
- attaching a layer of gold to said metal surface;
- placing a layer of indium over said layer of gold;
- heating said gold and indium above the melting point of indium to form a gold-indium alloy at the interface between said gold and indium;
- cooling; and
- pressing said indium onto said second surface.

28. A seal between an aluminum surface and a second surface of glass-like ceramic made by the process comprising:
- conforming the surface of said aluminum to said second surface;
- mechanically removing scratches and dents in the surface of said aluminum;
- etching said aluminum surface with a solution of nitric acid;
- rinsing said aluminum surface with water;
- applying a layer of gold, in the form of gold in a liquid, to the surface of said aluminum;
- firing said gold to leave a gold layer on said aluminum surface;
- placing a layer of indium over said layer of gold;
- heating said gold and indium above the melting point of indium to form a gold-indium alloy at the interface between said gold and indium;
- cooling; and
- pressing said indium onto said second surface.

29. A seal between an aluminum surface and a second surface of glass-like ceramic made by the process comprising: conforming the surface of said aluminum to said second surface;
- mechanically removing scratches and dents in the surface of said aluminum;
- etching said aluminum surface with a solution of nitric acid;
- rinsing said aluminum surface with water;
- coining said aluminum surface;
- applying a layer of gold, in the form of gold in a liquid, to the surface of said aluminum;
- firing said gold to leave a gold layer on said aluminum surface;
- placing a layer of indium over said layer of gold;
- heating said gold and indium above the melting point of indium to form a gold-indium alloy at the interface between said gold and indium;
- cooling; and
- pressing said indium onto said second surface.

30. A seal between an aluminum surface and a second surface of glass-like ceramic made by the process comprising:
- conforming the surface of said aluminum to said second surface;
- mechanically removing scratches and dents in the surface of said aluminum;
- etching said aluminum surface with a solution of nitric acid;
- rinsing said aluminum surface with water;
- applying a first layer of gold, in the form of gold in a liquid, to the surface of said aluminum;
- firing said gold to leave a first layer of gold on said aluminum surface;
- applying a second layer of gold, in the form of gold in a liquid, to said first gold layer;
- firing said gold to leave a second gold layer on said first gold layer;
- placing a layer of indium over said second layer of gold;
- heating said gold and indium above the melting point of indium to form a gold-indium alloy at the interface between said gold and indium;
- cooling; and
- pressing said indium onto said second surface.

31. A seal between an aluminum surface and a second surface of glass-like ceramic made by the process comprising:
- conforming the surface of said aluminum to said second surface;

mechanically removing scratches and dents in the surface of said aluminum;
etching said aluminum surface with a solution of nitric acid;
rinsing said aluminum surface with water;
coining said aluminum surface;
applying a first layer of gold, in the form of gold in a liquid, to the surface of said aluminum;
firing said gold to leave a first layer of gold on said aluminum surface;
applying a second layer of gold, in the form of gold in a liquid, to said first gold layer;
firing said gold to leave a second gold layer on said first gold layer;
placing a layer of indium over said second layer of gold;
heating said gold and indium above the melting point of indium to form a gold-indium alloy at the interface between said gold and indium;
cooling; and
pressing said indium onto said second surface.

32. A seal between a copper surface and a second surface of glass-like ceramic made by the process comprising:
electroplating a layer of gold onto the surface of said copper;
placing a layer of indium over said layer of gold;
heating said gold and indium above the melting point of indium to form a gold-indium alloy at the interface between said gold and indium;
cooling; and
pressing said indium onto said second surface.

* * * * *